United States Patent
Krynock et al.

(10) Patent No.: US 10,660,391 B2
(45) Date of Patent: May 26, 2020

(54) HELMET WITH FLOATING BROW BAND

(71) Applicant: Specialized Bicycle Components, Inc., Morgan Hill, CA (US)

(72) Inventors: Mike Krynock, Morgan Hill, CA (US); Zachary Rosen, Morgan Hill, CA (US); Jason Walton, Campbell, CA (US)

(73) Assignee: SPECIALIZED BICYCLE COMPONENTS, INC., Morgan Hill, CA (US)

( * ) Notice: Subject to any disclaimer, the term of this patent is extended or adjusted under 35 U.S.C. 154(b) by 49 days.

(21) Appl. No.: 15/947,431

(22) Filed: Apr. 6, 2018

(65) Prior Publication Data
US 2019/0307200 A1    Oct. 10, 2019

(51) Int. Cl.
*A42B 3/14*    (2006.01)
*A42B 3/06*    (2006.01)

(52) U.S. Cl.
CPC . *A42B 3/14* (2013.01); *A42B 3/06* (2013.01)

(58) Field of Classification Search
CPC .................................. A42B 3/06; A42B 3/14
USPC ............................................................. 2/411
See application file for complete search history.

(56) References Cited

U.S. PATENT DOCUMENTS

| | | | |
|---|---|---|---|
| 2,359,387 A * | 10/1944 | Riddell | A42B 3/14 2/6.6 |
| 2,451,140 A | 10/1948 | Wittcoff | |
| 2,758,306 A * | 8/1956 | Grancsay | A42B 3/14 2/419 |
| 2,814,043 A * | 11/1957 | Alesi | A42B 3/085 2/421 |
| 3,510,879 A * | 5/1970 | Webb | A42B 3/14 2/416 |
| 3,609,765 A * | 10/1971 | Molitoris | A42B 3/14 2/418 |
| 3,714,668 A * | 2/1973 | Mirabella | A42B 3/145 2/419 |
| 4,263,679 A * | 4/1981 | Erlendson | A42B 3/142 2/420 |

(Continued)

OTHER PUBLICATIONS

Extended European Search Report from the European Patent Office for Application No. 19165728.7-1017 dated Aug. 1, 2019 (7 pages).

*Primary Examiner* — Anne M Kozak
(74) *Attorney, Agent, or Firm* — Micheal Best & Friedrich LLP

(57) ABSTRACT

A helmet comprises an impact-absorbing shell, a band secured to the shell, and a resilient member. The band is secured to the shell at two securing locations such that an intermediate portion of the band between the two securing locations is in spaced relation to the shell. The resilient member is operatively positioned between the securing location and the impact-absorbing shell to facilitate resilient movement of the band relative to the impact-absorbing shell. The band comprises a brow assembly positioned at a front of the impact-absorbing shell and including a brow belt. The brow belt comprises a belt opening, and the resilient member is positioned in the belt opening. A portion of the belt defining the belt opening can be positioned in a groove in the resilient member. A fastener inserted through a fastener opening in the resilient member to secure the resilient member to the impact-absorbing shell.

9 Claims, 3 Drawing Sheets

(56) References Cited

U.S. PATENT DOCUMENTS

| | | | | |
|---|---|---|---|---|
| 4,884,301 A | * | 12/1989 | Aileo | A42B 3/08 2/421 |
| 5,088,130 A | * | 2/1992 | Chiarella | A42B 3/066 2/411 |
| 5,381,560 A | * | 1/1995 | Halstead | A42B 3/085 2/421 |
| 5,898,949 A | | 5/1999 | Barthold et al. | |
| 6,708,340 B1 | | 3/2004 | Dondero | |
| 7,140,049 B2 | * | 11/2006 | Lang-Ree | A42B 3/10 2/412 |
| 7,146,652 B2 | | 12/2006 | Ide et al. | |
| 7,376,980 B2 | * | 5/2008 | Bullock | A42B 3/066 2/421 |
| 7,770,239 B1 | * | 8/2010 | Goldman | A42B 3/142 2/415 |
| 7,841,026 B2 | | 11/2010 | Makris et al. | |
| 8,015,625 B2 | | 9/2011 | Grim et al. | |
| 8,578,520 B2 | * | 11/2013 | Halldin | A42B 3/066 2/411 |
| 8,826,463 B2 | | 9/2014 | Teetzel et al. | |
| 9,307,802 B2 | * | 4/2016 | Hall | A42B 3/142 |
| 9,468,248 B2 | | 10/2016 | Leon | |
| 9,560,892 B2 | | 2/2017 | Leon | |
| 9,788,591 B2 | | 10/2017 | Ide et al. | |
| 2005/0217006 A1 | * | 10/2005 | Sutter | A42B 3/06 2/416 |
| 2013/0239302 A1 | | 9/2013 | Ahlgren et al. | |
| 2016/0113346 A1 | * | 4/2016 | Lowe | A42B 3/064 2/412 |
| 2016/0316845 A1 | | 11/2016 | Halldin | |

\* cited by examiner

HELMET WITH FLOATING BROW BAND

BACKGROUND

The present invention relates to helmets and more specifically to helmet that facilitate impact absorption.

Modern helmets typically include an outer shell made from a hard plastic (e.g., polycarbonate), an impact-absorbing layer made of foam (e.g., EPS) secured to the inner surface of the outer shell, and a securing mechanism that secures the helmet to the user's head. The securing mechanism can include straps, pads, bands, and belts.

In one type of helmet, bands are secured to the helmet in such a way that they engage the user's head and hold the impact-absorbing layer at least partially spaced from the user's head. The bands are typically attached to the impact-absorbing layer with fasteners, adhesive, or any suitable device. The bands are commonly provided with pads that increase the comfort of the user.

SUMMARY

The present invention provides a helmet comprising an impact-absorbing shell having an inside surface, a band secured to the shell, and a resilient member. The band is secured to the shell at two securing locations such that an intermediate portion of the band between the two securing locations is held in spaced relation to the inside surface of the shell. The resilient member is operatively positioned between at least one of the securing locations and the impact-absorbing shell to facilitate resilient movement of the band relative to the impact-absorbing shell. Preferably, the impact-absorbing shell comprises an outer shell (e.g., polycarbonate) and an impact-absorbing layer (e.g., EPS) secured to an inner surface of the outer shell.

In one embodiment, the band comprises a brow assembly positioned at a front of the impact-absorbing shell. For example, the brow assembly can comprise a brow belt and a brow pad at least partially covering the brow belt. The brow belt preferably comprises a belt opening, and the resilient member preferably is positioned in the belt opening. For example, a portion of the belt defining the belt opening can be positioned in a groove in the resilient member.

The resilient member preferably further comprises a fastener opening, and the helmet preferably further comprises a fastener inserted through the fastener opening to secure the resilient member to the impact-absorbing shell. For example, the fastener opening can comprise a central opening positioned substantially in a center of the resilient member. Preferably, the resilient member is substantially disk-shaped.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
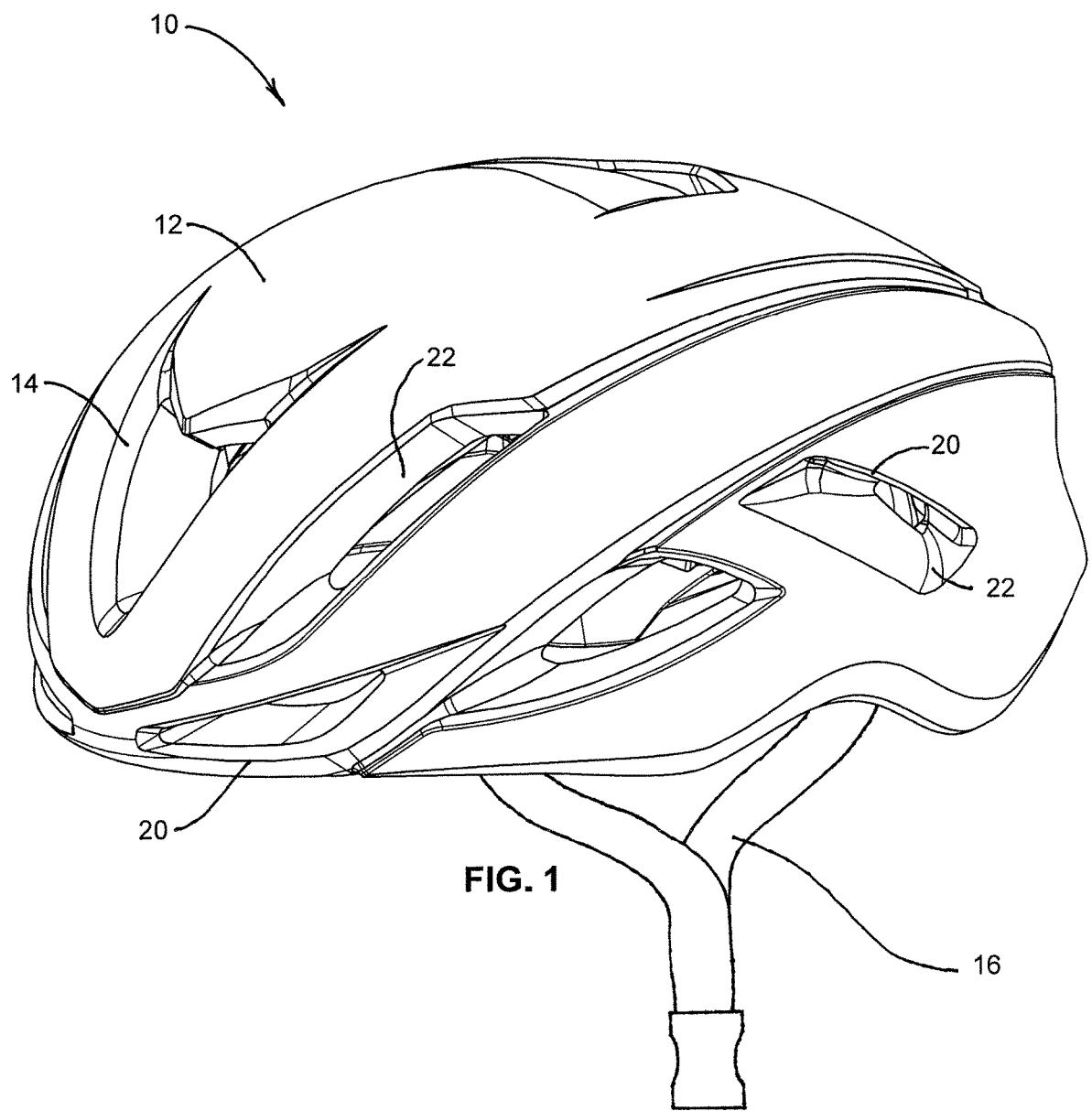
FIG. 1 is a perspective view of a helmet embodying the present invention.
Figure 2:
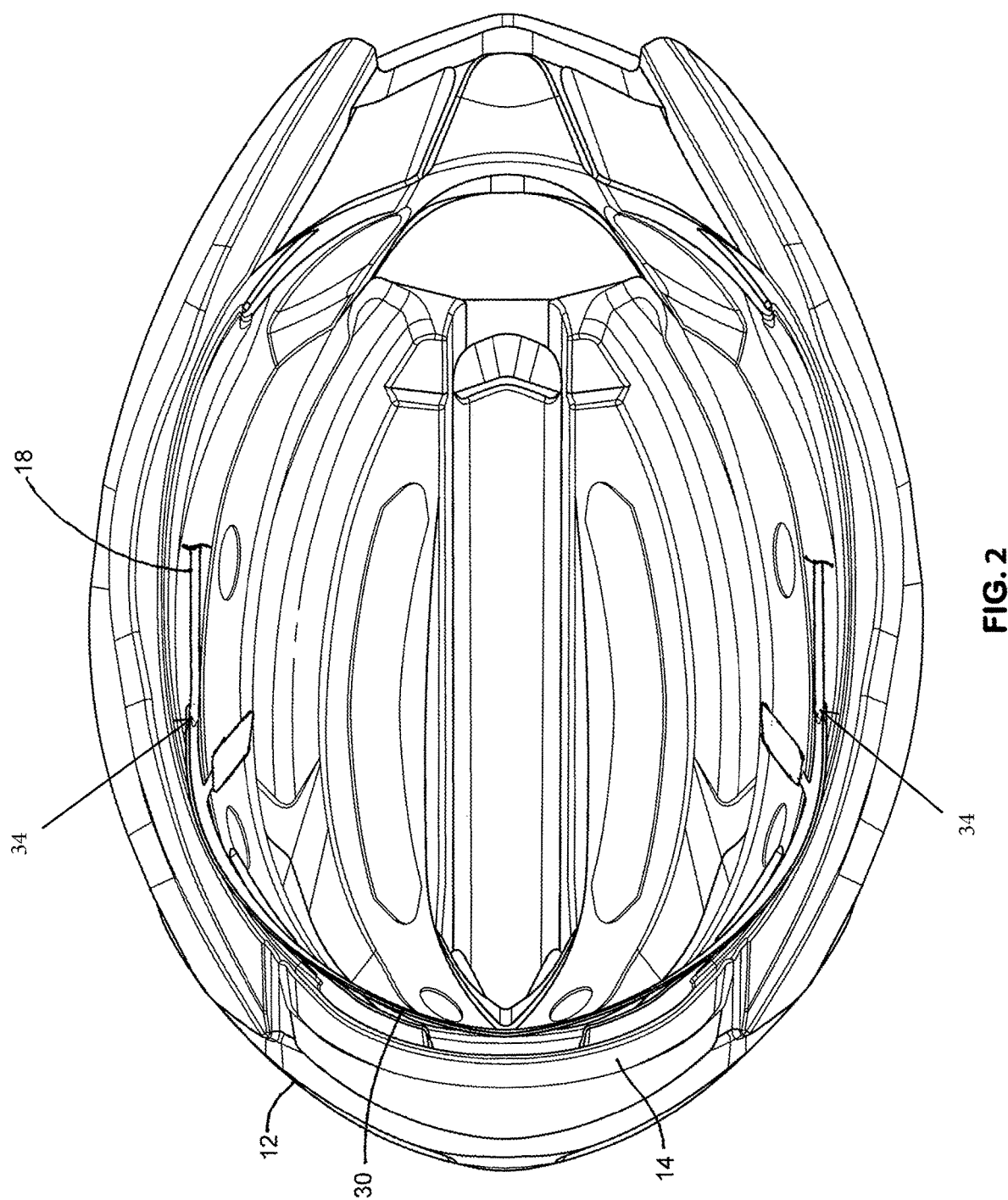
FIG. 2 is a bottom view of the helmet shown in FIG. 1, showing a brow assembly embodying the present invention with the strap assembly removed and the brow pad omitted.

FIG. 1 illustrates a helmet 10 comprising an outer shell 12, an impact-absorbing layer 14, and a securing mechanism including a strap assembly 16 and a belt assembly 18. The outer shell 12 includes an outer surface, an inner surface, and a plurality of outer vents 20. The impact-absorbing layer 14 is secured adjacent the inner surface of the outer shell 12. In the illustrated embodiment, the impact-absorbing layer 14 comprises a plurality of inner vents 22 aligned with the outer vents 20 to provide cooling to the user's head. The strap assembly 16 is used to secure the helmet to the user's head, as is generally known in the art and generally disclosed in U.S. Pat. No. 7,376,980, which is incorporated by reference in its entirety. The belt assembly 18 provides a snug fit between the helmet and the user's head, as is known in the art and generally disclosed in U.S. Pat. No. 8,015,625, which is hereby incorporate by reference in its entirety.

The illustrated outer shell 12 comprises a polycarbonate sheet that is molded into a desire outer shape of the helmet. The impact-absorbing layer 14 comprises expanded polystyrene (EPS) foam that is co-molded to the inner surface of the outer shell 12, as is generally known in the art. It should be understood that the materials of the outer shell 12 and impact-absorbing layer 14 described above could vary without departing from the features of the present invention.

Figure 3:
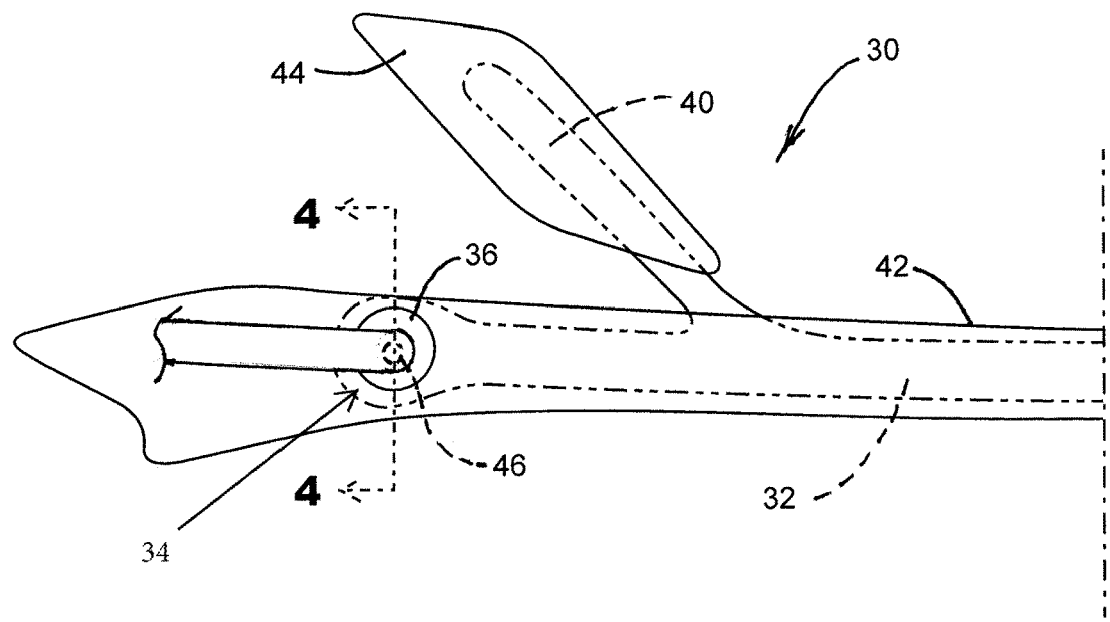
FIG. 3 is an enlarged side view of a left half of the brow assembly.
Figure 4:
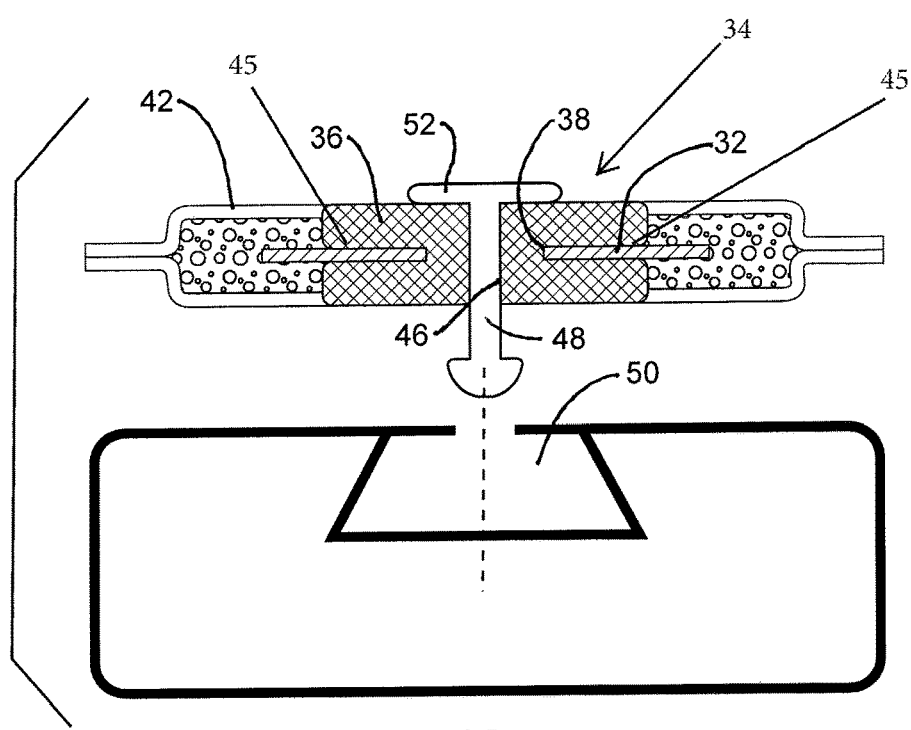
FIG. 4 is a section view taken along line 4-4 in FIG. 3.

The belt assembly 18 of the illustrated embodiment includes a brow assembly 30 that is designed to engage the user's forehead and hold the impact-absorbing layer 14 spaced from the user's forehead during normal operating conditions. FIG. 3 illustrates the inside view of the left half of the brow assembly 30. The illustrated brow assembly 30 comprises a brow belt 32, brow pads 42,44 partially covering the brow belt 32, and two resilient members 36 in the form of a resilient bushing secured to each end of the brow belt 32.

The brow belt 32 is an elongated strip made of polycarbonate. Each end of the belt defines a securing location 34 having a belt opening 38 that facilitates securing the brow belt 32 to the EPS foam, as described below in more detail. The brow assembly 30 further includes two temple portions 40 that are designed to rest near a user's temples.

The brow pads include a forehead pad 42 that covers part of the brow belt 32 and temple pads 44 that cover part of the temple portions 40. Each of the pads 42,44 is made from a soft, open-cell foam covered with a polyester fabric cover, as is generally known in the art.

Each resilient member 36 is positioned in a corresponding belt opening 38 of the brow belt 32. Each resilient member 36 includes grooves 45 that receive a portion of the brow belt 32. Each resilient member 36 is preferably co-molded to the brow belt 32 and includes a central opening 46 that is designed to receive a fastener for securing the brow belt 32 to the impact-absorbing layer 14, as described below in more detail. The one embodiment, the resilient member is made of silicone, polyurethane, or other suitable elastomer.

The illustrated brow belt 32 is secured to the impact absorbing layer 14 at the two securing locations by push-type fasteners 48 that go through the central openings 46 in the resilient members 36 and into a snap basket 50 embedded in the impact-absorbing layer 14. These push-type fasteners 48 and snap baskets 50 are generally known in the art. The fastener 48 of the illustrated embodiment is formed integrally with a rear fit belt 52 that extends rearward around the back of the user's head to adjustably hold the helmet 10 on the user's head, as is known in the art.

Various features and advantages of the invention are set forth in the following claims.

The invention claimed is:

1. A helmet comprising:
   an impact-absorbing shell having an inside surface;
   a brow assembly having a brow belt secured to the impact-absorbing shell at two separate securing locations along the brow belt such that an intermediate portion of the brow belt between the two separate securing locations is held in spaced relation to the inside surface of the impact-absorbing shell; and
   a circular resilient member coupled to the brow belt to facilitate resilient movement of the brow belt relative to the impact-absorbing shell at one of the two separate securing locations, the resilient member having a groove, wherein at least a portion of the brow belt is positioned in the groove.

2. A helmet as claimed in claim 1, wherein the impact-absorbing shell comprises an outer shell and an impact-absorbing layer secured to an inner surface of the outer shell.

3. A helmet as claimed in claim 1, wherein the outer shell comprises polycarbonate and the impact-absorbing layer comprises expanded polystyrene.

4. A helmet as claimed in claim 1, wherein the brow assembly is positioned at a front of the impact-absorbing shell.

5. A helmet as claimed in claim 1, wherein the brow assembly comprises a brow pad at least partially covering the brow belt.

6. A helmet as claimed in claim 5, wherein the brow belt comprises a belt opening and wherein the resilient member is positioned partially in the belt opening.

7. A helmet as claimed in claim 1, wherein the resilient member further comprises a fastener opening, and wherein the helmet further comprises a fastener inserted through the fastener opening to secure the resilient member to the impact-absorbing shell.

8. A helmet as claimed in claim 7, wherein the fastener opening is a central opening positioned in a center of the resilient member.

9. A helmet as claimed in claim 1, wherein a first portion of the resilient member extends along one side of the brow belt and a second portion of the resilient member extends along an opposite side of the brow belt, such that the brow belt is spaced from the impact-absorbing shell by the second portion of the resilient member.

\* \* \* \* \*